United States Patent [19]

Armantrout

[11] 4,243,442

[45] Jan. 6, 1981

[54] PRE-SOLUTION PREPARATION OF DOUBLE BASE PROPELLANT BINDER

[75] Inventor: Robert J. Armantrout, Salt Lake City, Utah

[73] Assignee: The United States of America as represented by the Secretary of the Navy, Washington, D.C.

[21] Appl. No.: 38,761

[22] Filed: May 14, 1979

[51] Int. Cl.³ .............................................. C06B 45/10
[52] U.S. Cl. .................................. 149/19.92; 149/19.8; 149/109.6
[58] Field of Search .................. 149/19.92, 109.6, 19.8

[56] References Cited

U.S. PATENT DOCUMENTS

| | | | |
|---|---|---|---|
| 4,011,114 | 3/1977 | Allabashi | 149/19.92 |
| 4,082,583 | 4/1978 | Mosher | 149/109.6 |
| 4,102,953 | 7/1978 | Johnson et al. | 149/19.92 |
| 4,177,227 | 12/1979 | Harvey et al. | 149/19.92 |

*Primary Examiner*—Edward A. Miller
*Attorney, Agent, or Firm*—R. S. Sciascia; W. Thom Skeer; Lloyd E. K. Pohl

[57] ABSTRACT

A method for preparing a binder for use in a double base propellant comprising forming a suspension of stabilizer components in the binder material by low shear mixing, combining the suspension with a plasticizer by dry sparge air mixing and removing of water by a combination of continued dry sparge air mixing and elevated temperature.

4 Claims, No Drawings

PRE-SOLUTION PREPARATION OF DOUBLE BASE PROPELLANT BINDER

BACKGROUND OF THE INVENTION

1. Field of the Invention

This invention relates to a process for manufacturing crosslinking binder for use in double base propellant.

2. Description of the Prior Art

The prior art technique for readying binder for use in a double base propellant comprises the steps of:

A. dissolving the binder in acetone with high shear mixing;
B. combining the solution with plasticizer by nitrogen sparge gas mixing; and
C. stripping acetone and water from the mixture by continuing the nitrogen sparge gas mixing and applying heat.

This process has drawbacks in that it utilizes a flammable and volatile solvent (acetone) which presents a safety hazard; utilizes a transient ingredient (acetone) which may not be entirely eliminated by the third step; utilizes an ingredient (acetone) which is costly; takes considerable time; requires nitrogen gas sparge to inert exhaust; and requires somewhat complicated tooling for high shear mixing. It would be advantageous if some or all of these drawbacks could be eliminated.

SUMMARY OF THE INVENTION

According to this invention, an improved process for preparing crosslinked binders for use in double base propellants is provided. This invention replaces the prior art step of dissolving the binder in acetone with a step wherein a suspension is formed by combining the binder and stabilizer components and subjecting them to low shear mixing. Plasticizer is then added to the suspension thus formed and mixed in with dry sparge air mixing. That mixture is then stripped of water by continued dry sparge air mixing and heat.

DESCRIPTION OF THE PREFERRED EMBODIMENT

The binder to be readied for use according to this invention is a nitrocellulose polyester binder. At the times mentioned herein, it is a liquid though it is later cured to a solid.

The first step utilized in practicing this invention involves forming a suspension of granular stabilizer material in the liquid binder material by combining the stabilizer material and the binder material and subjecting the combination to low shear mixing. The granular stabilizer material may be any solid stabilizer commonly used in nitrocellulose-polyester binders such as n-isopropyl p-nitroaniline, 2-nitrodiphenylamine or the like. It has been found that subjecting a combination of liquid binders and solid granular stabilizing components to a slowly moving paddle for from 0.25 to 0.75 hours will cause a suspension to be formed. It is in this step that the improvement of this invention lies. This step eliminates the prior art step in which the binder was dissolved in acetone.

The next step utilized in practicing this invention involves combining the suspension formed in the first step with plasticizer by dry sparge air mixing. Typical plasticizers are nitroglycerine, trimethylolethane trinitrate (TMETN), diethylene glycol dinitrate (DEGDN), triethylene glycol dinitrate (TEGDN), and the like. To accomplish this step, one adds the plasticizer to the suspension formed in step one (or visa versa) and bubbles dry air through the combination to cause thorough mixing to take place. From 0.75 to 1.0 hours of bubbling action are sufficient.

The third and final step of this invention involves stripping traces of water from the combination formed in step two by continuing dry sparge air treatment and, at the same time, applying heat. Sparge mixing and heating are utilized until the water content drops to about 0.01% or lower as determined by various methods such as the Karl Fischer moisture analysis procedure. A temperature on the order of about 140° F. for 24 hours is sufficient. However, higher temperatures for less time or lower temperatures for longer times will work.

What is claimed is:

1. A method for readying a combination of nitrocellulose and liquid polyester which contains traces of water for use as a binder in a double base propellant, said method comprising the steps of:

A. adding granular stabilizer material to said combination and forming a suspension by subjecting the granular stabilizer material, nitrocellulose and polyester to low shear mixing;
   B. combining the suspension with a plasticizer and forming a plasticized suspension by means of dry sparge air mixing; and
   C. stripping the traces of water from the plasticized suspension by continuing dry sparge air mixing and, at the same time, applying heat for a predetermined length of time.

2. A method according to claim 1 wherein the plasticizer is selected from the group consisting of nitroglycerine, trimethylolethane trinitrate, diethylene glycol dinitrate and triethylene glycol dinitrate.

3. A method according to claim 1 wherein the heat applied is 140° F. and the predetermined length of time is 24 hours.

4. A method according to claim 3 wherein the application of heat and sparge gas mixing are continued until the water content becomes about 0.01%.

* * * * *